April 30, 1940.　　　　L. B. SMITH　　　　2,198,682
MANUFACTURE OF ALKALI METAL FORMALDEHYDE SULPHOXYLATE
Filed Sept. 7, 1938
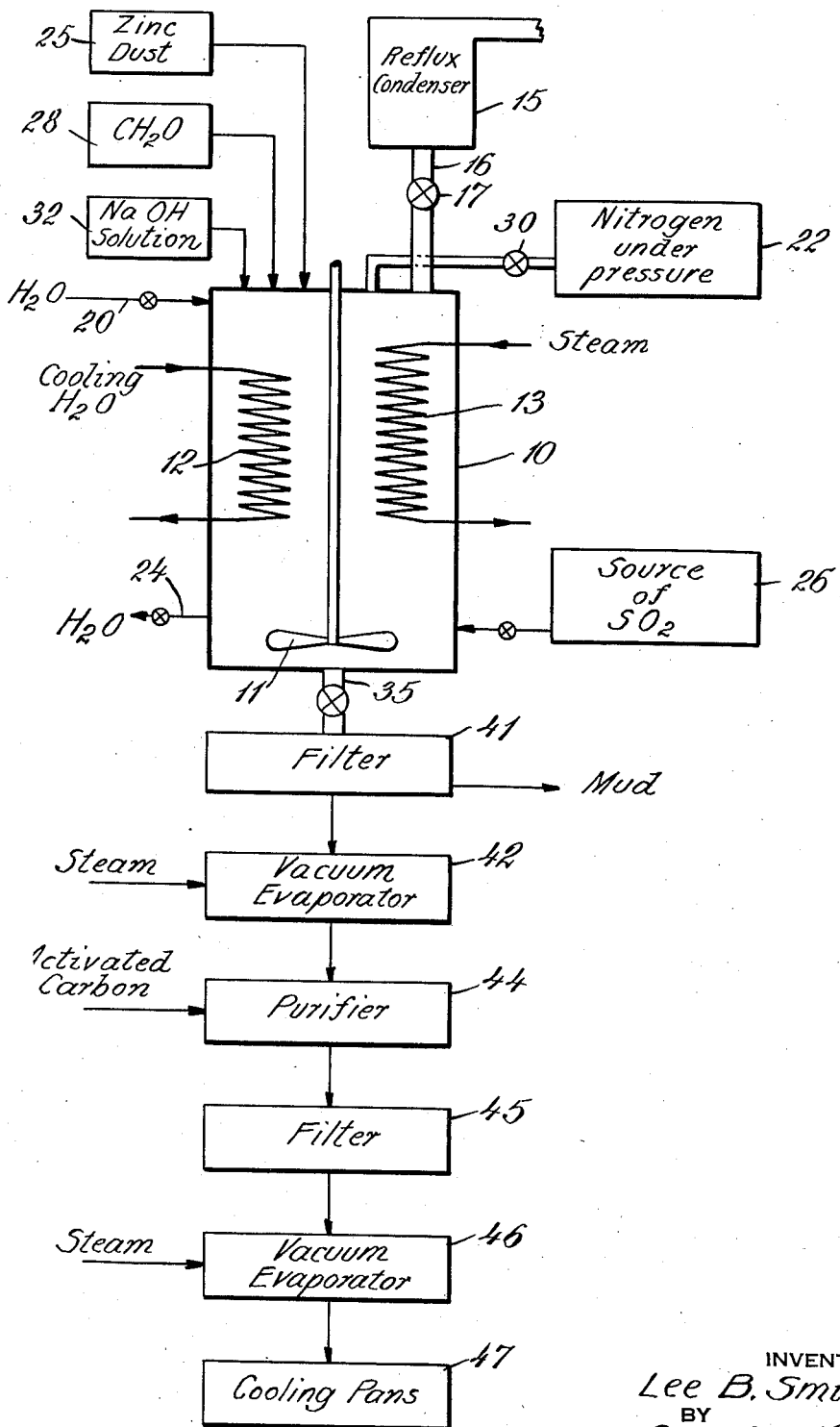
INVENTOR
Lee B. Smith
BY
Joseph G. Ryan
ATTORNEY Patented Apr. 30, 1940

2,198,682

UNITED STATES PATENT OFFICE 2,198,682

MANUFACTURE OF ALKALI METAL FORMALDEHYDE SULPHOXYLATE

Lee B. Smith, Woodbridge, N. J., assignor to General Chemical Company, New York, N. Y., a corporation of New York Application September 7, 1938, Serial No. 228,791

7 Claims. (Cl. 260—500)

This invention relates to the manufacture of alkali metal formaldehyde sulphoxylate. The invention is more especially directed to processes for making sodium formaldehyde sulphoxylate solutions and to processes for treating such solutions so as to recover therefrom pure white $NaHSO_2CH_2O.2H_2O$ which completely dissolves in water to form a clear, colorless solution.

Prior methods for making alkali metal formaldehyde sulphoxylates may be divided into two type procedures. In the first, sodium formaldehyde bisulphite is directly reduced by zinc to form a sodium formaldehyde sulphoxylate solution and a zinc hydroxide precipitate. After separation of the precipitate, sodium formaldehyde sulphoxylate is recovered from solution by crystallization. In the second type procedure, $SO_2$ and zinc dust are reacted in aqueous suspension to produce zinc hydrosulphite. On addition of formaldehyde, a solution comprising zinc formaldehyde bisulphite and zinc formaldehyde sulphoxylate is formed. The zinc formaldehyde bisulphite is reduced to sulphoxylate by further quantity of zinc, and the mass is then converted to sodium formaldehyde sulphoxylate for example by addition of sodium carbonate. The sequence of steps of the process of the present invention, so far as production of sodium formaldehyde sulphoxylate solution is concerned, in a general way parallels the second type procedure. While chemical reactions involved in the production of sodium formaldehyde sulphoxylate are fairly well understood in a broad sense, such reactions are relatively difficult to control and are easily thrown out of balance. The problem facing manufacturers has been to develop manipulative procedure by which these reactions may be efficiently carried out and commercial yields obtained. One of the chief difficulties seems to be encountered in effecting good reduction of the zinc formaldehyde bisulphite to the sulphoxylate. To bring about improvements numerous proposals have been made involving features such as carrying out the reduction of the zinc formaldehyde bisulphite by means of relatively high temperature and pressure; in the presence of catalysts with or without pressure; in the presence of acids and other so-called promoters; and also under pressure and in the presence of sodium hydroxide in quantity calculated to convert the mass to sodium formaldehyde sulphoxylate. Reduction operations carried out in the presence of promoters have not provided notably increased yields, and moreover are likely to induce side reactions resulting in impurities in the product and require added procedural steps to recover the promoters. The high installation and operating costs of pressure equipment offset whatever advantages may be obtained in the way of increased yields.

One feature of the process of the invention provides for the production of alkali metal formaldehyde sulphoxylate solutions by an easily manipulated direct method which may be carried out in cheaply constructed and operated apparatus and which does not require use of pressure apparatus or extraneous promoters such as catalysts, various acids and other substances. One of the principal objects of the invention is to provide a method facilitating recovery, from such solutions and from alkali metal formaldehyde sulphoxylate solutions generally, of solid, high-test alkali metal formaldehyde sulphoxylate which dissolves completely in water to form a clear, colorless solution.

In carrying out the process of the invention a solution containing equimolecular parts of zinc formaldehyde bisulphite and zinc formaldehyde sulphoxylate may be obtained in any satisfactory way, for example by reacting one molecular proportion of zinc dust in aqueous suspension with two molecular proportions of $SO_2$ to form zinc hydrosulphite $ZnS_2O_4$, and then adding to the latter two molecular proportions of formaldehyde. The next step is directed to reduction of the zinc formaldehyde bisulphite to zinc formaldehyde sulphoxylate, probably the basic zinc formaldehyde sulphoxylate. To the solution comprising zinc formaldehyde bisulphite and zinc formaldehyde sulphoxylate, zinc dust is added in amount preferably not less than 10% in excess of that equivalent to one molecular proportion. I have found that if this mass, containing the indicated zinc excess is gently boiled at atmospheric pressure,—preferably in the absence of alkali metal, catalysts or other promoters,—and the evolved vapors allowed to reflux, until a test shows no further increase in the reducing value, good reduction of the zinc formaldehyde bisulphite may be obtained. I have also found that cooling of the reduced solution to not more than 90° C. followed by addition of alkali metal hydroxide to convert the mass to alkali metal formaldehyde sulphoxylate, taken together with the described bisulphite reduction procedure, contribute largely to securing commercially satisfactory overall yields.

In prior methods, the final sodium formaldehyde sulphoxylate product is usually obtained by filtering the zinc hydroxide precipitate out of the sodium formaldehyde sulphoxylate solution, concentrating the filtrate, and recovering the sodium formaldehyde sulphoxylate by crystallization. In many instances products of such procedure are off color, and even if not off color when dissolved in water form a cloudy solution and in time a whitish, water insoluble material (probably zinc sulphoxylate, $ZnSO_2$) settles out. This invention provides process by which this difficulty may be overcome. I have discovered that if a crude solution of alkali metal formaldehyde sulphoxylate is treated, e. g. by evaporation, so as to form at least a relatively thin slurry, and preferably a thick slurry, of alkali metal formaldehyde sulphoxylate crystals, there is created in the mass a condition conducive to ready precipitation, in solid easily separable form, of those impurities (including probably zinc sulphoxylate) which cause the turbidity of water solutions of alkali metal formaldehyde sulphoxylate products when in use. Further, I find that precipitate formed under such conditions does not redissolve and that if the crystals in the slurry are liquefied, as by raising the temperature of the mass, the solid impurities may be separated from the solution as by filtration. Alkali metal formaldehyde sulphoxylate product in pure form may then be recovered from the filtrate.

Following is an illustrative example of the process of the invention described in connection with the accompanying drawing showing diagrammatically apparatus which may be employed. The invention will be described in connection with production of sodium formaldehyde sulphoxylate, although the principles of the invention are applicable to manufacture of other alkali metal products.

Production of zinc hydrosulphite, formation of a solution comprising zinc formaldehyde bisulphite and zinc formaldehyde sulphoxylate, reduction of zinc formaldehyde bisulphite to zinc formaldehyde sulphoxylate, and conversion of the mass to a crude solution of sodium formaldehyde sulphoxylate may all be effected in a reactor 10. This vessel is equipped with an agitator 11, cooling coil 12, heating coil 13, and is connected to a reflux condenser 15 through a conduit 16 controlled by valve 17. In starting up the process, the reactor is completely filled with water through an inlet 20. Valve 17 is closed, and water in the reactor is displaced with nitrogen under pressure from a holder 22 until there remains in the reactor about 1985 parts by weight of water, the water displaced being discharged through a valve controlled outlet 24. The agitator is started and 262 parts of commercial 93% grade zinc dust is charged into the reactor from a bin 25. Sulphur dioxide gas from a source 26 is fed into the bottom of the reactor until the zinc hydrosulphite forming reaction is completed, as will be indicated by a color change from dark slate grey to almost white, at which point gassing is discontinued. During $SO_2$ introduction, the temperature of the mass is maintained below about 38° C. by circulation of water through cooling coil 12. The zinc hydrosulphite is formed in accordance with the equation $$Zn+2SO_2 \rightarrow ZnS_2O_4$$

Then from tank 28, 573 parts of 37% commercial formaldehyde are added gradually while holding the temperature of the mass below about 42° C. Agitation is continued for about half an hour. The reaction effected results in production of zinc formaldehyde bisulphite and zinc formaldehyde sulphoxylate in equimolecular proportions in accordance with the equation $$2ZnS_2O_4+4CH_2O+2H_2O = Zn(HSO_3CH_2O)_2+Zn(HSO_2CH_2O)_2$$

After this reaction is completed the solution is stable and may be handled without guarding against decomposition on exposure to air. Accordingly, the nitrogen holder 22 may be disconnected by closing valve 30 and the reactor 10 may be opened to the atmosphere by opening valve 17.

The next step comprises reduction of zinc formaldehyde bisulphite to zinc formaldehyde sulphoxylate and for this purpose about 289 parts of 93% grade zinc dust are added from bin 25. This quantity of zinc amounts to about 15% excess over that theoretically required to reduce the zinc formaldehyde bisulphite to sulphoxylate. The mass is heated to a gentle boil by steam coils 13, the vapors formed being refluxed by condenser 15. The batch is likely to foam vigorously and rise in the reactor during the first part of the reduction. If foaming becomes excessive, supply of heat through coils 13 may be temporarily discontinued as circumstances require. The zinc formaldehyde bisulphite reducing reaction is continued by heating until a test sample shows no further increase in the reducing value of the liquor in the reactor. At this point reduction of zinc formaldehyde bisulphite to sulphoxylate is substantially complete. A batch such as that described in the present example would ordinarily require about three hours heating, refluxing and agitation to reduce the zinc formaldehyde bisulphite.

The mass in the reactor may be now converted to sodium formaldehyde sulphoxylate solution and zinc hydroxide precipitate. I have discovered that to obtain the best overall yields, the sodium used should be in the form of sodium hydroxide, and further that introduction of sodium hydroxide should be effected subsequent to conversion of zinc formaldehyde bisulphite to sulphoxylate, that is reduction to sulphoxylate is effected in the absence of sodium. Moreover, I find that the caustic soda should be added after the mass in the reactor has been cooled to not more than 90°. While the caustic soda may be introduced as a solid it is preferred to feed in the same as a 40% water solution. After cooling, the caustic soda solution is charged from tank 32 until a test portion of the mass just turns red to phenolphthalein. In the present example, about 762 parts of a 40% NaOH solution will be required.

There is now present in the reactor a crude sodium formaldehyde sulphoxylate solution from which purified solid sodium formaldehyde sulphoxylate may be recovered in accordance with the present invention.

The batch from the reactor is run through line 35 into filter 41 in which the zinc hydroxide precipitate is filtered out. The cake obtained may be water washed, and the washings combined with the sodium formaldehyde sulphoxylate filtrate, and the mud discarded or treated for zinc recovery.

As previously indicated, in many instances products of prior processes are off color and even if not off color when dissolved in water often form a cloudy solution, probably caused by or in some way associated with formation and settling out of a light-colored water insoluble material thought to be largely zinc sulphoxylate. I have found that difficulties in this respect may be overcome by first treating the crude sodium formaldehyde sulphoxylate solution so as to form a slurry mass comprising an appreciable quantity of sodium formaldehyde sulphoxylate crystals. I have discovered that there is thus created in the mass a condition which promotes complete precipitation, in easily separable form, of those impurities which cause the turbidity of water solutions of sodium formaldehyde sulphoxylate products when in use. Furthermore, I have found that the impure precipitate formed under such conditions is stable and does not redissolve during subsequent treatment or handling of the mass to recover sodium formaldehyde sulphoxylate. I then liquefy the crystals of the mass, preferably treat the resulting liquor with a filter-aid, and separate the solid impurities from the liquor. Solid sodium formaldehyde sulphoxylate product may then be recovered from the liquid.

Although formation of a slurry mass comprising sodium formaldehyde sulphoxylate crystals, liquefaction of the crystals, separation of solid impurities and ultimate recovery from the resulting liquor of pure sodium formaldehyde sulphoxylate product may be carried out in any satisfactory way, I find that recovery of pure product from a crude sodium formaldehyde sulphoxylate solution may be economically effected by what may be considered broadly as a two-stage vacuum evaporation process. Commercial sodium formaldehyde suphoxylate contains two waters of crystallization and melts in its own water of crystallization at about 65° C. Briefly outlined, the preferred process for recovering product from crude sodium formaldehyde sulphoxylate solutions comprises first evaporating the solution under a vacuum sufficiently great to effect concentration of the liquor at temperature below the melting point of sodium formaldehyde sulphoxylate. In this way, there is formed a slurry mass containing a substantial amount of sodium formaldehyde sulphoxylate crystals, conditions promoting precipitation of impurities are created, and a large part of the water is removed from the solution. Preferably, the vacuum is broken and the mass is heated to a temperature above the melting point of sodium formaldehyde sulphoxylate so as to liquefy the crystals. While any satisfactory filter-aid may be employed, I find that activated carbon is especially satisfactory since this material not only facilitates ready filtration of the solid material but also effects removal, from the particular type of liquors involved in the process, of very small quantities of substances which might tend to discolor water solutions of the ultimate product. Accordingly, after addition of the filter-aid, the liquor is filtered while maintaining temperature above the melting point of sodium formaldehyde sulphoxylate. The filtrate is then evaporated, preferably under vacuum and at temperature above the melting point of sodium formaldehyde sulphoxylate, to a concentration such that a sufficient amount of water is removed so that the product will test 100% or more on the basis of sulphoxylate with two molecules of water of crystallization, and the mass will set up as a solid cake on cooling.

The filtrate from filter 41 is run into vacuum evaporator 42 and evaporated at pressure about 25–40 mm. of mercury and temperature of about 40° C. Evaporation is stopped when crystals separate out in abundance. The volume of the initial filtrate will have been reduced about 40%. The liquor is then heated in the evaporator to about 85° C. Crystals are melted and the liquor is discharged into purifier 44. About 4 parts of finely divided activated carbon are introduced, the mass is agitated for 20 to 30 minutes, and then filtered in filter 45. The mud in the filter may be washed with about 10 parts of water, the mud discarded, and washings together with the filtrate from filter 45 are run into evaporator 46. The temperature to which the liquor is heated in evaporator 42 after release of the vacuum is such that the temperature of the liquor between discharge from evaporator 42 and introduction into evaporator 46 does not drop below about 70° C. or in any event below the melting point of sodium formaldehyde sulphoxylate. In evaporator 46, the liquor is concentrated at pressure of about 100 mm. of mercury and at temperature of about 75° C. The liquor is evaporated until a dip sample tests 100% $NaHSO_2CH_2O.2H_2O$. By carrying out the final evaporation at temperature above the melting point of sodium formaldehyde sulphoxylate, solidification of sulphoxylate in the evaporator may be prevented, and enough water may be removed to give a product which will test 100% or more on the basis of sulphoxylate with two molecules of water of crystallization.

The concentrated liquor is then run into pans 47, and after cooling sets up in solid cakes which when broken up and subsequently dissolved in water for use form permanently clear, colorless solutions.

I claim:

1. The process for making alkali metal formaldehyde sulphoxylate which comprises forming a solution comprising zinc formaldehyde bisulphite and zinc formaldehyde sulphoxylate, introducing metallic zinc in amount not less than 10% in excess of that theoretically required to reduce the bisulphite to sulphoxylate, gently boiling the mass at atmospheric pressure in the substantial absence of alkali metal and while refluxing the resulting vapors until there is substantially no further increase in the reducing value of the mass, cooling the mass to not more than about 90° C., then adding alkali metal hydroxide to convert the resulting mass to alkali metal formaldehyde sulphoxylate, forming a slurry comprising alkali metal formaldehyde sulphoxylate crystals, liquefying the crystals, separating solid material from the resulting liquid, and then recovering alkali metal formaldehyde sulphoxylate therefrom.

2. In the manufacture of alkali metal formaldehyde sulphoxylate involving formation of a crude alkali metal formaldehyde sulphoxylate solution, the improvement comprising forming a slurry comprising alkali metal formaldehyde sulphoxylate crystals, liquefying the crystals, and separating solid material from the resulting liquid.

3. In the manufacture of alkali metal formaldehyde sulphoxylate involving formation of a crude alkali metal formaldehyde sulphoxylate solution, the improvement comprising forming a slurry mass comprising alkali metal formaldehyde sulphoxylate crystals, converting the crystals in the mass to liquid form, separating solid material from the resulting liquor, and then recovering solid alkali metal formaldehyde sulphoxylate therefrom.

4. In the manufacture of alkali metal formaldehyde sulphoxylate involving formation of a crude alkali metal formaldehyde sulphoxylate solution, the improvement comprising forming a slurry mass comprising alkali metal formaldehyde sulphoxylate crystals, converting the crystals in the mass to liquid form, treating the resulting liquor mass with activated carbon, separating solid material from the liquor, and then recovering solid alkali metal formaldehyde sulphoxylate therefrom.

5. In the manufacture of alkali metal formaldehyde sulphoxylate involving formation of a crude alkali metal formaldehyde sulphoxylate solution, the improvement comprising forming a slurry comprising alkali metal formaldehyde sulphoxylate crystals, heating slurry to temperature sufficient to liquefy the crystals, separating solid material from the resulting liquor while maintaining the same at temperature high enough to prevent crystallization of alkali metal formaldehyde sulphoxylate, and then recovering solid alkali metal formaldehyde sulphoxylate from said liquor.

6. In the manufacture of alkali metal formaldehyde sulphoxylate involving formation of a crude alkali metal formaldehyde sulphoxylate solution, the improvement comprising evaporating said solution at temperature less than the melting point of solid alkali metal formaldehyde sulphoxylate in its own water of crystallization to form a slurry comprising alkali metal formaldehyde sulphoxylate crystals, heating the slurry to temperature above said melting point to liquefy the crystals, separating solid material from the resulting liquor while maintaining the same at temperature above said melting point, and then recovering solid alkali metal formaldehyde sulphoxylate from said liquor.

7. In the manufacture of alkali metal formaldehyde sulphoxylate involving formation of a crude alkali metal formaldehyde sulphoxylate solution, the improvement comprising evaporating said solution under vacuum and at temperature less than the melting point of solid alkali metal formaldehyde sulphoxylate in its own water of crystallization to form a slurry comprising alkali metal formaldehyde sulphoxylate crystals, heating the slurry to temperature above said melting point to liquefy the crystals, separating solid material from the resulting liquor while maintaining the same at temperature above said melting point, and further evaporating said liquor under vacuum and at temperature above said melting point to concentration such that on cooling to normal temperature the resulting mass sets up as a solid cake.

LEE B. SMITH.